United States Patent
Elmieh et al.

(10) Patent No.: US 9,214,005 B2
(45) Date of Patent: Dec. 15, 2015

(54) METHODS AND SYSTEMS FOR OVERRIDING GRAPHICS COMMANDS

(71) Applicant: Google Technology Holdings LLC, Mountain View, CA (US)

(72) Inventors: Baback Elmieh, Palo Alto, CA (US); Maha Deva Guruji Panda, Sunnyvale, CA (US); James Paul Ritts, Los Angeles, CA (US); David Lock, Felton, CA (US)

(73) Assignee: Google Technology Holdings LLC, Mountain View, CA (US)

(*) Notice: Subject to any disclaimer, the term of this patent is extended or adjusted under 35 U.S.C. 154(b) by 281 days.

(21) Appl. No.: 13/718,120

(22) Filed: Dec. 18, 2012

(65) Prior Publication Data

US 2014/0168239 A1 Jun. 19, 2014

(51) Int. Cl.
*G06T 1/20* (2006.01)
*G06F 3/14* (2006.01)
*G09G 5/36* (2006.01)

(52) U.S. Cl.
CPC ...... *G06T 1/20* (2013.01); *G06F 3/14* (2013.01); *G09G 5/363* (2013.01); *G09G 2320/0261* (2013.01); *G09G 2340/0435* (2013.01); *G09G 2350/00* (2013.01)

(58) Field of Classification Search
CPC ..................................... G06F 3/14; G06T 1/20
See application file for complete search history.

(56) References Cited

U.S. PATENT DOCUMENTS

| 7,095,416 B1* | 8/2006 | Johns et al. ............ 345/522 |
| 8,175,121 B2 | 5/2012 | Fukuda et al. |
| 8,228,338 B1* | 7/2012 | Duluk et al. ............ 345/520 |

(Continued)

FOREIGN PATENT DOCUMENTS

| WO | 2007003340 A2 | 1/2007 |
| WO | WO-2014099275 | 6/2014 |

(Continued)

OTHER PUBLICATIONS

Gepner, Pawel, and Michal Filip Kowalik. "Multi-core processors: New way to achieve high system performance." Parallel Computing in Electrical Engineering, 2006. PAR ELEC 2006. International Symposium on. IEEE, 2006.*

(Continued)

*Primary Examiner* — Kee M Tung
*Assistant Examiner* — Ryan M Gray
(74) *Attorney, Agent, or Firm* — Wolfe-SBMC

(57) ABSTRACT

Disclosed are "graphics overrides." An override accepts a stream of graphics commands as produced by an application and then modifies the stream before it is rendered by the GPU. Different overrides perform different modifications. One override can modify a stream of graphics commands in response to another stream. Overrides can enforce conformity with a visual paradigm and, by being modified, can support a change to that paradigm without requiring the applications to change. Overrides can monitor the entire computing environment and improve the response to that environment of a particular application: For example, an override monitors frames as they are produced by an application. If the application cannot keep up with a fixed frame rate, then the override produces "synthetic" frames to take the place of missing frames. Overrides are not restricted to fixing existing problems. Rather, applications can be developed that depend upon the presence of overrides.

20 Claims, 10 Drawing Sheets

(56) References Cited

U.S. PATENT DOCUMENTS

| | | | |
|---|---|---|---|
| 8,724,704 | B2 | 5/2014 | Ryu |
| 8,766,984 | B2 | 7/2014 | Mark et al. |
| 8,982,137 | B2 | 3/2015 | Elmieh et al. |
| 9,137,320 | B2 | 9/2015 | Elmieh |
| 2002/0150123 | A1 | 10/2002 | Ro |
| 2003/0016246 | A1 | 1/2003 | Singh |
| 2004/0179262 | A1 | 9/2004 | Harman et al. |
| 2005/0200627 | A1 | 9/2005 | Desylva |
| 2008/0058969 | A1 | 3/2008 | Nixon et al. |
| 2009/0128574 | A1 | 5/2009 | Fujii et al. |
| 2010/0013842 | A1* | 1/2010 | Green et al. ............ 345/522 |
| 2010/0020087 | A1 | 1/2010 | Elmieh et al. |
| 2011/0018884 | A1* | 1/2011 | Ritts et al. ............ 345/522 |
| 2012/0081376 | A1 | 4/2012 | Sowerby et al. |
| 2012/0105452 | A1* | 5/2012 | Diard ............ 345/428 |
| 2012/0266094 | A1 | 10/2012 | Starr et al. |
| 2014/0035945 | A1 | 2/2014 | Anglin et al. |
| 2014/0071141 | A1 | 3/2014 | Hunkins et al. |
| 2014/0168240 | A1 | 6/2014 | Elmieh |
| 2014/0173028 | A1 | 6/2014 | Elmieh |

FOREIGN PATENT DOCUMENTS

| | | |
|---|---|---|
| WO | WO-2014099277 | 6/2014 |
| WO | WO-2014099301 | 6/2014 |

OTHER PUBLICATIONS

"Non-Final Office Action", U.S. Appl. No. 13/718,150, Jul. 14, 2014, 11 pages.

Patent Cooperation Treaty, International Search Report and Written Opinion of the International Searching Authority for International Application No. PCT/US2013/071913, Feb. 21, 2014, 9 pages.

Patent Cooperation Treaty, "PCT Search Report and Written Opinion of the International Searching Authority" for International Application No. PCT/US2013/071578 dated Mar. 3, 2014, 11 pages.

Dane, G. et al., "Encoder-Assisted Adaptive Video Frame Interpolation", 2005 IEEE International Conference on Acoustics, Speech, and Signal Processing, Mar. 18-23, 2005, vol. 2, Mar. 18, 2005, 4 pages.

Patent Cooperation Treaty, "PCT Search Report and Written Opinion of the International Searching Authority" for International Application No. PCT/US2013/071592 dated Mar. 3, 2014, 10 pages.

"Non-Final Office Action", U.S. Appl. No. 13/718,199, Feb. 12, 2015, 6 pages.

"Notice of Allowance", U.S. Appl. No. 13/718,150, Nov. 5, 2014, 15 pages.

"Supplemental Notice of Allowance", U.S. Appl. No. 13/718,150, Feb. 13, 2015, 2 pages.

"Notice of Allowance", U.S. Appl. No. 13/718,199, May 11, 2015, 4 pages.

"Supplemental Notice of Allowance", U.S. Appl. No. 13/718,199, Aug. 21, 2015, 2 pages.

\* cited by examiner

METHODS AND SYSTEMS FOR OVERRIDING GRAPHICS COMMANDS

CROSS-REFERENCE TO RELATED APPLICATIONS

The present application is related to U.S. patent applications 13/718,150 (Pat. No. 8,982,137) and 13/718,199 (Pat. No. 9,137,320), filed on an even date herewith and incorporated by reference herein in their entireties.

TECHNICAL FIELD

The present disclosure is related generally to computer graphics processing and, more particularly, to displaying information on a computer screen.

BACKGROUND

In a modern computing device, applications, utilities, and the operating system all run on, and share the processing power of, a central processing unit ("CPU").

(Note 1: Computing devices now commonly parse out their work among multiple processors. For clarity's sake, the present discussion uses the term "CPU" to cover all single- and multiple-processor computing architectures.)

(Note 2: The phrase "applications, utilities, and the operating system" is shorthand for the set of all entities that may present information to a computer screen. Distinctions among these entities are, for the most part, of little import to the present discussion. Therefore, for clarity's sake, all of these entities are all usually called "applications" from here on unless a particular distinction is being drawn.)

When an "application" needs to present visual information to a user of a computing device, rather than directly issuing commands to the hardware that controls a display screen of that device, the application writes a series of graphics commands. These commands are sent to a graphics processing unit ("GPU") which interprets the commands and then draws on the display screen.

Because the applications, utilities, and the operating system running on the device may all send graphics commands to the GPU, conflicts among the commands may arise. As a simple example, an application may command that a window be opened in a portion of the screen in which the operating system wishes to draw a background image (or "wallpaper"). The GPU knows the presentation hierarchy established among the applications (i.e., which one's display information should be "on top" and should thus overwrite that of the others) and resolves any conflicts accordingly. In the present example, the application is on top, so its window occludes a portion of the background wallpaper displayed by the operating system. Instead of occlusion, the GPU can be commanded to merge disparate images to make, for example, an "upper" image semi-transparent so that a "lower" image can be seen through it.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
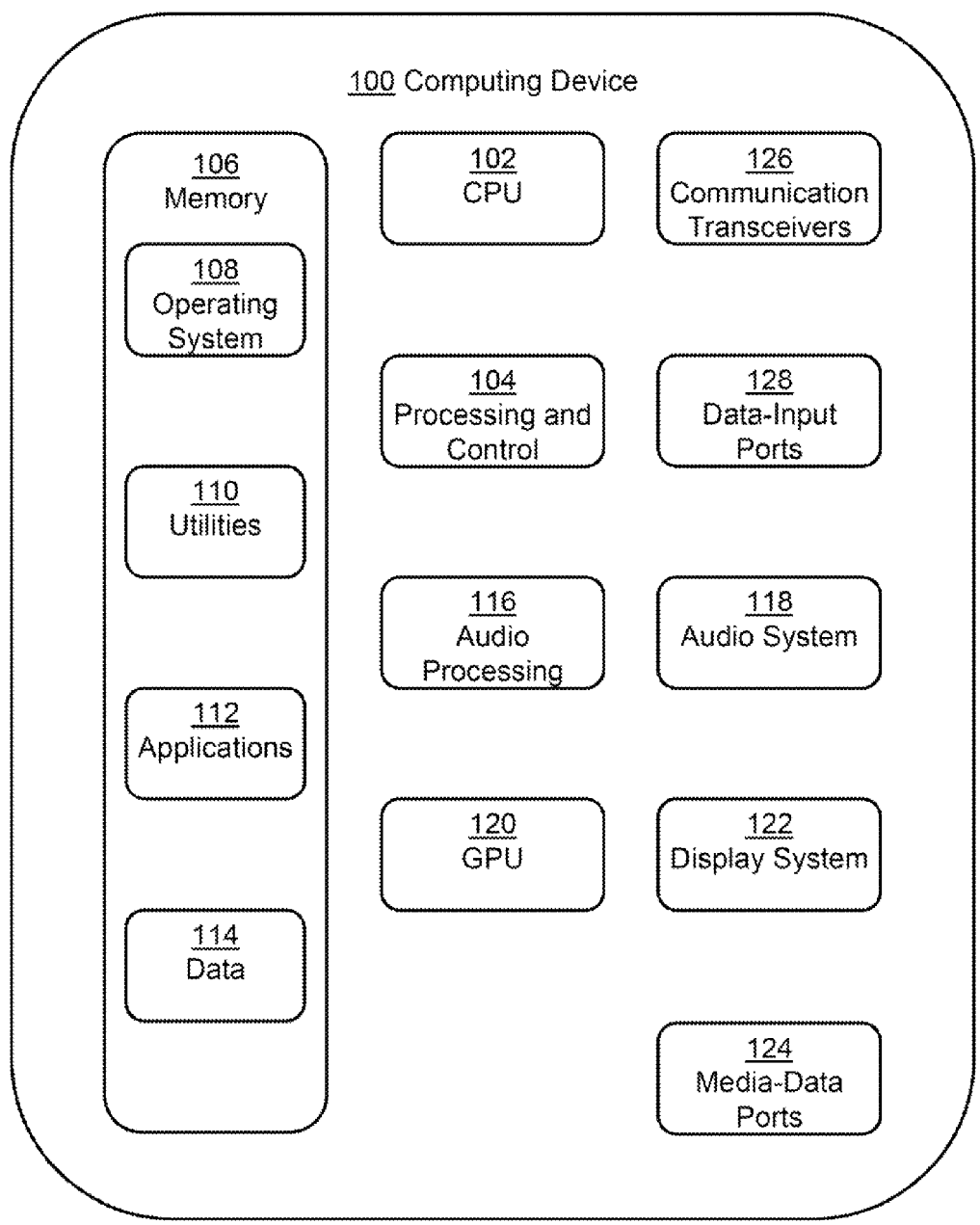
FIG. 1 is a generalized schematic of a computing device in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Powerful as it is, the existing model in which applications send graphics commands to be implemented by a GPU presents significant limitations. A first limitation is based on what may be called the "too-many-authors" problem: In current open computing architectures, applications are developed by a disparate set of authors, and the applications are hosted by a computing device running an operating system and utilities written by yet other authors. It would be surprising if all of these authors together accidentally presented a unified visual scene. Existing GPUs are not intelligent enough to radically transform the visual information they are commanded to present, therefore if a designer of a computing device wishes to have all of the applications running on the device conform to a given visual paradigm, then one option would be to constrain the applications to use only a restricted set of graphics commands (a set that, for example, does not allow changing certain fixed parameters). Of course, this reduces the flexibility of the developed applications, and that could be annoying to authors and to users alike. Also, because there are so many different applications controlled by no single authority, it may become essentially impossible to update all of the applications when the visual paradigm is changed.

A second, and more reasonable, response to the too-many-authors problem is to allow the authors the use of the full set of graphics commands but to publish guidelines for implementing the visual paradigm. Often, however, application authors fail to follow the guidelines, either through a misunderstanding or in order to achieve an effect not allowed for by the guidelines. And, as with the first option, there may be no feasible update path when the paradigm shifts.

A second limitation posed by the application-to-GPU model may be called the "too many externalities" problem: It is very difficult to draft an application that can account for everything in the computing environment outside of the application itself that may be running concurrently on the computing device, especially as that "everything" may include applications and other software written by the disparate set of authors mentioned above. When computing resources are in high demand, a given application may begin to fail or to operate in an unanticipated fashion. As the computing environment changes with the addition of more and different applications, it becomes unrealistic to assume that all of the applications are written in such a manner that they can handle the strain. Because of the too-many-authors problem, it is also unrealistic to assume that these applications can all be upgraded as needed whenever the computing environment changes.

To address these and other limitations of the application-to-GPU model, the present disclosure introduces the concept of a "graphics override." The override accepts a stream of graphics commands as produced by an application and then modifies the stream before it is rendered by the GPU.

Generally speaking, the earliest overrides are implemented as code (or as parameters for a more generic code) to run on the CPU. In the future, it is expected that some overrides will be hosted directly by the GPU.

Different overrides perform different modifications. As a simple example, one override can review all of the incoming graphics commands from all applications and other software, find the commands that call for text to be displayed, and modify those commands so that they conform to a standard (e.g., they all use the same font and contrast).

Overrides can be very general or very specific in their focus. One override can modify a stream of graphics commands in response to another stream. Overrides can enforce conformity with a visual paradigm and, by being modified, can support a change to that paradigm without requiring the applications to change. Overrides can monitor the entire computing environment and improve the response to that environment of a particular application. In an example explained in detail below, an application is supposed to produce frames at a fixed rate. An override monitors the frames as they are produced by the application. If the application cannot keep up with the fixed rate, then the override produces "synthetic" frames to take the place of missing frames. Thus, the overrides prevents the application from producing jerky output when the load on the CPU is heavy.

Overrides are not restricted to fixing existing problems. Rather, applications can be developed that depend upon the presence of overrides. In another example detailed below, overrides support "A/B testing" of a new software product. A product is sent to two sets of users. Each set is also given a particular override. The first set of users experiences the product as modified by a first override, and the second set experiences the same product but with a second override in place. User-response data are gathered to see which override is preferred. The "winning" override is then incorporated into the release version of the product. Future overrides can be sent to further modify the user experience, either to support further testing or to implement an altered experience.

To understand these concepts more fully, first consider the representative computing device 100 of FIG. 1. The device 100 is meant to represent any computing device that presents visual information. It could be, for example, a personal communications device with a display screen, a mobile telephone, a personal digital assistant, or a personal or tablet computer. In some embodiments, the device 100 presents visual information to be displayed on a screen separate from the device 100 itself, such as a set-top box, gaming console, or server. The device 100 could even be a plurality of servers working together in a coordinated fashion.

The CPU 102 of the device 100 includes one or more processors (i.e., any of microprocessors, controllers, and the like) or a processor and memory system which processes computer-executable instructions to control the operation of the device 100. The device 100 can be implemented with a combination of software, hardware, firmware, and fixed-logic circuitry implemented in connection with processing and control circuits, generally identified at 104. Although not shown, the device 100 can include a system bus or data transfer system that couples the various components within the device 100. A system bus can include any combination of different bus structures, such as a memory bus or memory controller, a peripheral bus, a universal serial bus, and a processor or local bus that utilizes any of a variety of bus architectures.

The computing device 100 also includes one or more memory devices 106 that enable data storage, examples of which include random-access memory, non-volatile memory (e.g., read-only memory, flash memory, EPROM, and EEPROM), and a disk storage device. A disk storage device may be implemented as any type of magnetic or optical storage device, such as a hard disk drive, a recordable or rewritable disc, any type of a digital versatile disc, and the like. The device 100 may also include a mass-storage media device.

The memory system 106 provides data storage mechanisms to store device data 114, other types of information and data, and various device applications 112. An operating system 108 can be maintained as software instructions within the memory 106 and executed by the CPU 102. The device applications 112 may also include a device manager, such as any form of a control application or software application. The utilities 110 may include a signal-processing and control module, code that is native to a particular component of the device 100, a hardware-abstraction layer for a particular component, and so on.

The computing device 100 also includes an audio-processing system 116 that processes audio data and controls an audio system 118 (which may include, for example, speakers). A GPU 120 processes graphics commands and visual data and controls a display system 122 that can include, for example, a display screen. The audio system 118 and the display system 122 may include any devices that process, display, or otherwise render audio, video, display, or image data. Display data and audio signals can be communicated to an audio component or to a display component via a radio-frequency link, S-video link, High-Definition Multimedia Interface, composite-video link, component-video link, Digital Video Interface, analog audio connection, or other similar communication link, represented by the media-data ports 124. In some implementations (e.g., a set-top box which drives a television monitor), the audio system 118 and the display system 122 are components external to the device 100. Alternatively (e.g., in a cellular telephone), these systems 118, 122 are integrated components of the device 100.

The computing device 100 can include a communications interface which includes communication transceivers 126 that enable wired or wireless communication. Example transceivers 126 include Wireless Personal Area Network radios compliant with various IEEE 802.15 standards, Wireless Local Area Network radios compliant with any of the various IEEE 802.11 standards, Wireless Wide Area Network cellular radios compliant with 3GPP standards, Wireless Metropolitan Area Network radios compliant with various IEEE 802.16 standards, and wired Local Area Network Ethernet transceivers.

The computing device 100 may also include one or more data-input ports 128 via which any type of data, media content, or inputs can be received, such as user-selectable inputs (e.g., from a keyboard, from a touch-sensitive input screen, or from another user-input device), messages, music, television content, recorded video content, and any other type of audio, video, or image data received from any content or data source. The data-input ports 128 may include USB ports, coaxialcable ports, and other serial or parallel connectors (including internal connectors) for flash memory, storage disks, and the like. These data-input ports 128 may be used to couple the device 100 to components, peripherals, or accessories such as microphones and cameras.

Figure 2:
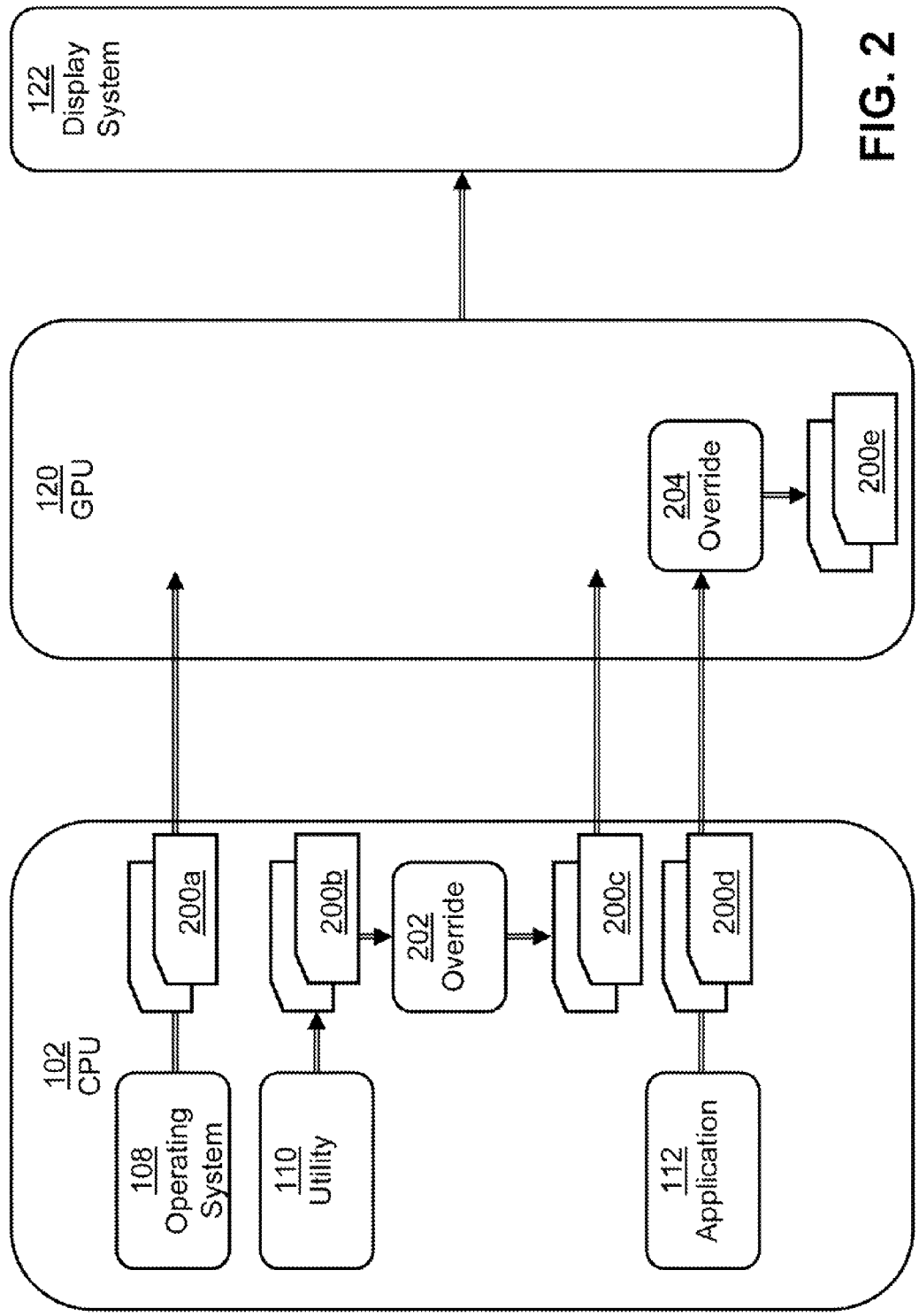
FIG. 2 is a dataflow diagram showing overrides being applied to streams of graphics commands.

Before considering detailed techniques for using overrides (see the discussion below accompanying FIGS. 3 through 9), turn to FIG. 2 which gives examples of where overrides can be implemented in the processing architecture. Running on the CPU 102 of the computing device 100 are an operating system 108, a utility program 110, and an application 112.

In FIG. 2, the operating system 108 is operating according to prior conventions, that is, without an override. The operating system 108 produces a stream of graphics commands 200a that are sent to the GPU 120. The GPU 120 implements these commands 200a as appropriate and thereby controls the display system 122. (Note: As discussed above, commands from various sources 108, 110, 112 running on the CPU 102 may conflict, so the GPU 120 implements all commands "as appropriate" by considering the display context and the hierarchy of the sources 108, 110, 112 of the graphics commands. Thus, the GPU 120 may perform some graphics commands exactly as specified, may ignore others, and may perform still others in a manner different from what the commands explicitly call for.)

Next consider the utility 110. It produces its own stream of graphics commands 200b. However, before those commands 200b get to the GPU 120, they are intercepted by the CPU-hosted override 202. That override 202 examines and amends its incoming stream 200b. It then sends an amended stream 200c to the GPU 120 which processes the amended stream 200c just as it would process any other stream of graphics commands (paying attention, of course, to the source and context of that stream).

Finally, the application 112 produces its stream of graphics commands 200d which are dutifully sent to the GPU 120. Before implementing these commands 200d, however, the GPU-hosted override 204 intercepts them and modifies them to produce the amended stream 200e. This amended stream 200e is then processed within the GPU 120. (Note that most current GPUs cannot host overrides such as 204. However, as GPUs become more powerful and flexible, it is anticipated that this will become a useful adjunct to CPU-hosted overrides like 202.)

Note that the assignment of the three techniques in FIG. 2, i.e., no override to the operating system 108, a CPU-hosted override 202 to the utility 110, and a GPU-hosted override 204 to the application 112 is completely arbitrary. Any type of software process 108, 110, 112 may use any of these techniques and may even use more than one technique at the same time. Thus, the amended stream 200c produced by the CPU-hosted override 202 may itself be intercepted by another CPU-hosted override or even by a GPU-hosted override. Also, some of the graphics commands 200d produced by the application 112 may go to the override 204 while other commands go to another override. These are straightforward matters of implementation and management of the presently disclosed techniques.

Figure 3:
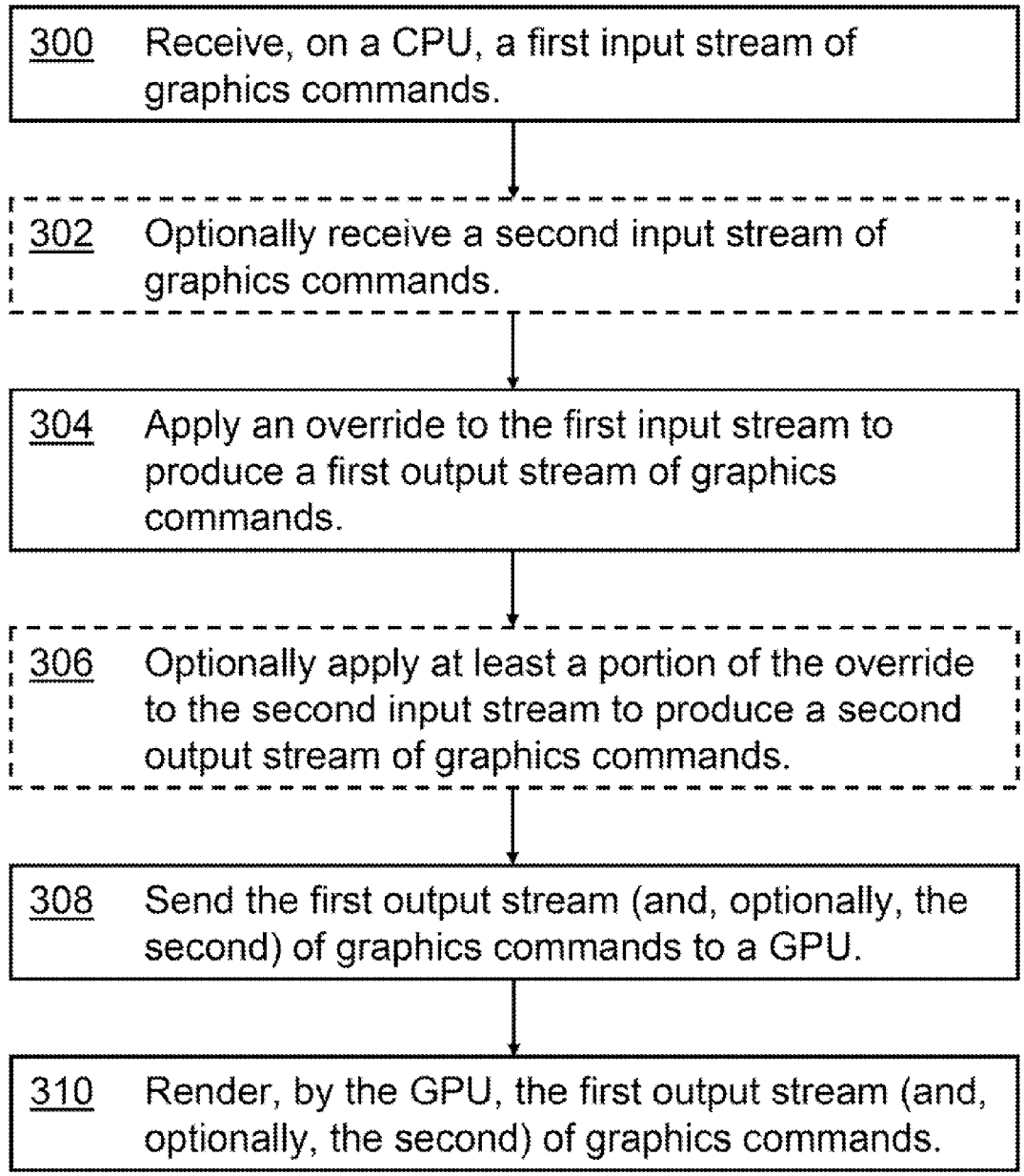
FIG. 3 is a flowchart of a representative method for applying a graphics override.

With this general background in mind, turn to FIG. 3 which presents a representative method for using a CPU-hosted override such as the override 202 of FIG. 2.

Figure 7:
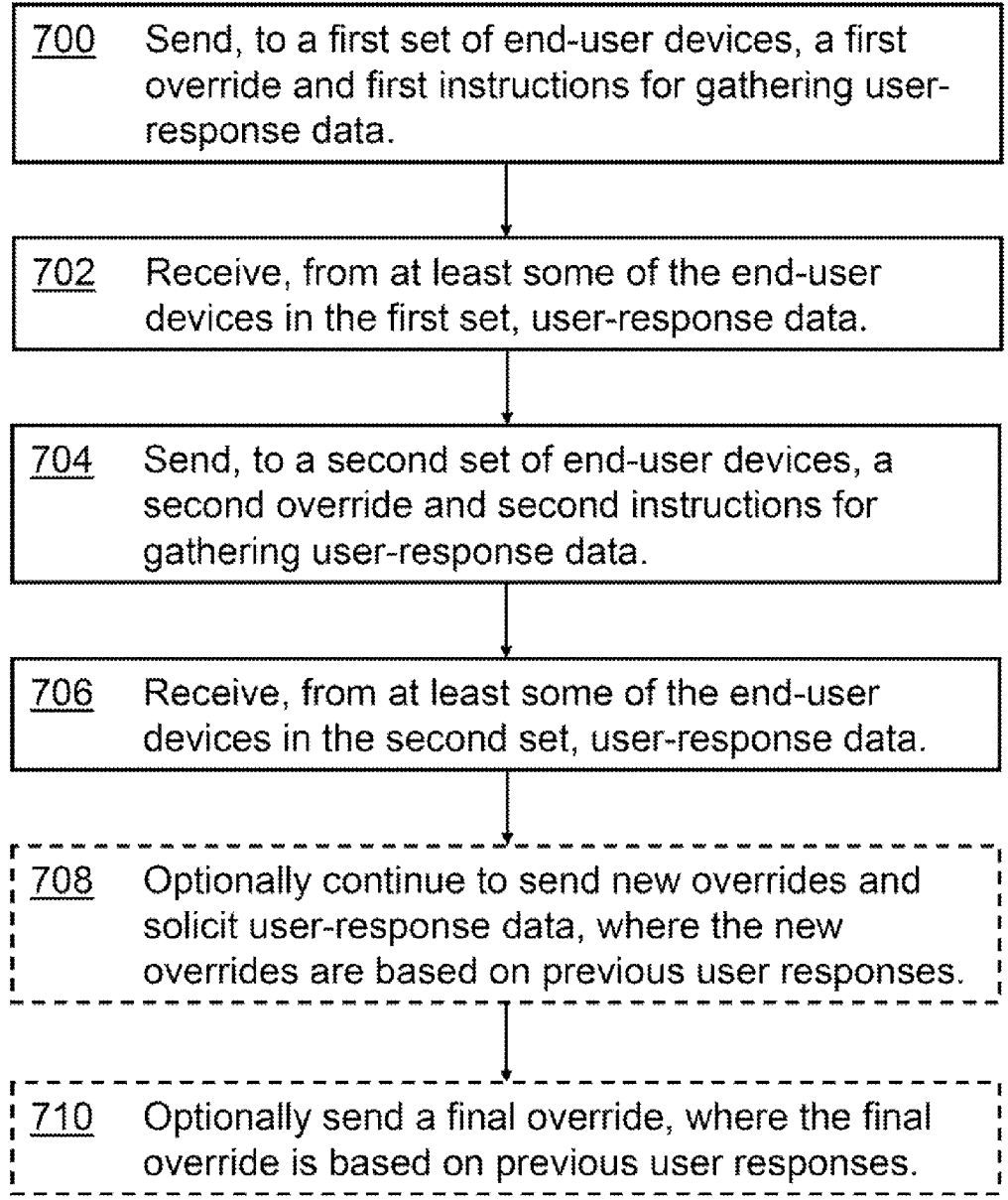
FIG. 7 is a flowchart of a representative method for a server to gather user-response data.
Figure 8:
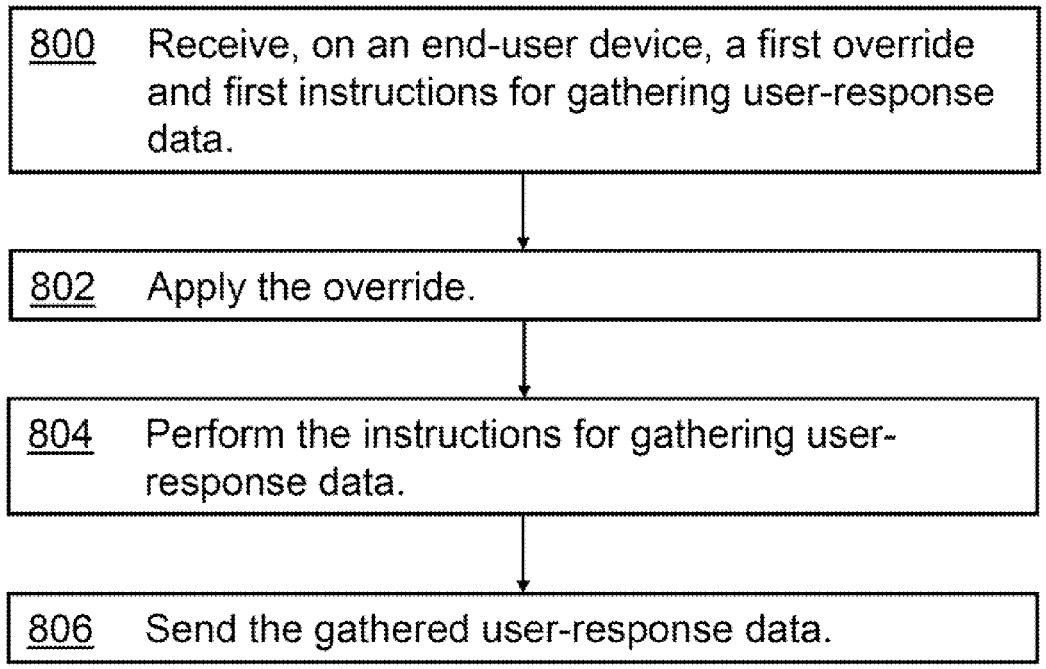
FIG. 8 is a flowchart of a representative method for an end-user device to gather user-response data.
Figure 9:
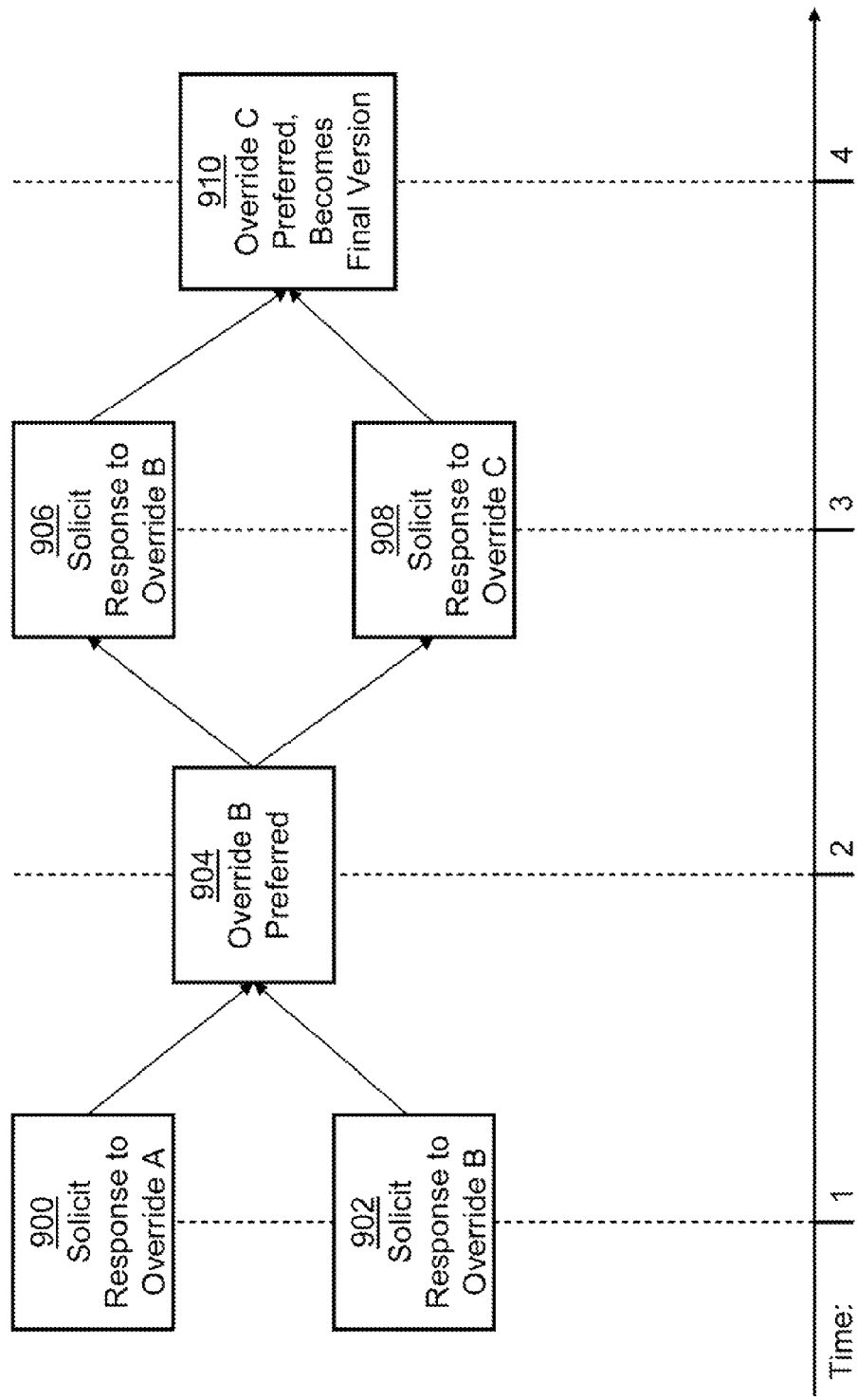
FIG. 9 is a schematic diagram of a selection process driven by user-response data.

The method begins at step 300 where a stream of graphics commands 200b is produced as output by an source application 108, 110, 112. In some embodiments, the source 108, 110, 112 is not aware of the fact that its output is going to an override. In contrast with this, the discussion accompanying FIGS. 7 through 9 presents a circumstance in which the source application is written to depend upon the presence of an override.

In optional step 302, a second stream of graphics commands is received. This step (along with optional step 306 discussed below) emphasizes that the relation between sources 108, 110, 112 and overrides need not be one-to-one: A single override may accept graphics commands from multiple sources 108, 110, 112.

In step 304, the override 202 is applied to its input stream of graphics commands 200b and produces an amended output stream of graphics commands 200c.

The override 202 is a code instance separate from the source 108, 110, 112 of the stream of graphics commands 200b. Although separate, in some embodiments, the override 202 can be given full access to information about the internal status of the source 108, 110, 112 and about the context in which that source 108, 110, 112 is running (see the example of FIGS. 5 and 6, discussed below), including, for example, the relationship of the current source to other applications and possibly the environment beyond the computing device 100 (e.g., an override may access the Web to gather important information). On the other hand, other overrides may be limited in their knowledge (for security's sake) and may not even be aware of the source 108, 110, 112 of the input stream 200b but may simply process the input stream 200b without regard to the identity or nature of the source 108, 110, 112 of that stream 200b.

In general, an override 202 can be developed to perform any type of amendment to the input stream 200b, including adding, deleting, modifying, and re-arranging graphics commands. The amendment may simply change a single parameter in a single graphics command as, for example, when the input "stream" 200b has a single command to draw a blue box, and the amended output stream 200c has a single command to draw a red box. Or the override 202 can change all text commands so that the output 200c (and potentially the output from all sources 108, 110, 112) has a consistent font or other appearance parameter.

In some cases, the output stream 200c stream may be null, that is, the override 202 cancels, at least for a time, the visual output of the source 108, 110, 112.

The processing performed by a given override 202 can be very simple, as shown by the examples given above, or very complex. For example, an override 202 may receive as input a static image 200b and change the image's perspective (e.g., tilt or scale it) or even add motion to the image 200b to produce a video output 200c. A sophisticated override 202 may generate, from the input graphics command stream 200b, a scene graph (as known in the art). The scene graph may then be modified, and the output stream of graphics commands 200c may then be created directly from the modified scene graph and, thus, only indirectly from the input stream of graphics commands 200b. Although creating and interpreting a scene graph requires a good deal of processing power, it is a good option for some overrides 202 because the override 202 can then apply existing graphics tools (e.g., an element identifier, shader, properties module, or physics engine) to the created scene graph to produce sophisticated effects. The override 202 may be implemented as a set of instructions or rules that take account of the current context and of past developments (i.e., the override 202 can have a memory). The rules of the override 202 may even specify when to invoke itself or another override.

In optional step 306, the override 202 is applied, at least in part, to the second input stream (see step 302) to produce a second output stream. Note that this technique can be applied to allow the override 202 to coordinate among multiple instances of the same, or different, sources 108, 110, 112. For example, multiple players of a game may each run a separate instance of a game application 112. The override 202 receives the output graphics streams of all of the game-application instances, harmonizes them, and then either produces a separate output graphics stream 200c for each user, or a single output stream 200c for all the users (i.e., the first and second output streams 200c of steps 304 and 306 may be the same stream 200c, or the output streams 200c may each be based on the totality of the input streams 200b). In another example, an override 202 can accept the outputs of multiple applications 112 and modify those outputs so that they fit into a unified user interface, perhaps by tiling the separate inputs or by blending them together.

The output streams 200c produced by the override 202 are sent in step 308 to the GPU 120. The streams 200c may be identified to the GPU 120 as produced by their ultimate sources 108, 110, 112 or as produced by the override 202 itself (As discussed above, the GPU 120 uses this source information for resolving conflicts among graphics commands.)

The GPU 120, which in the method of FIG. 3 may be an existing GPU, renders, in step 310, the graphics streams it receives, including non-amended streams such as 200a (e.g., a status update message from the operating system 108; see FIG. 2) and amended streams such as 200c. The rendering may be done directly to a display screen on, or hosted by, the computing device 100. In some situations, the rendered output of the GPU 120 may be sent to a communications interface 126 (as when a server performs graphics processing too burdensome for an end-user device) or stored in a memory system 106.

Figure 4:
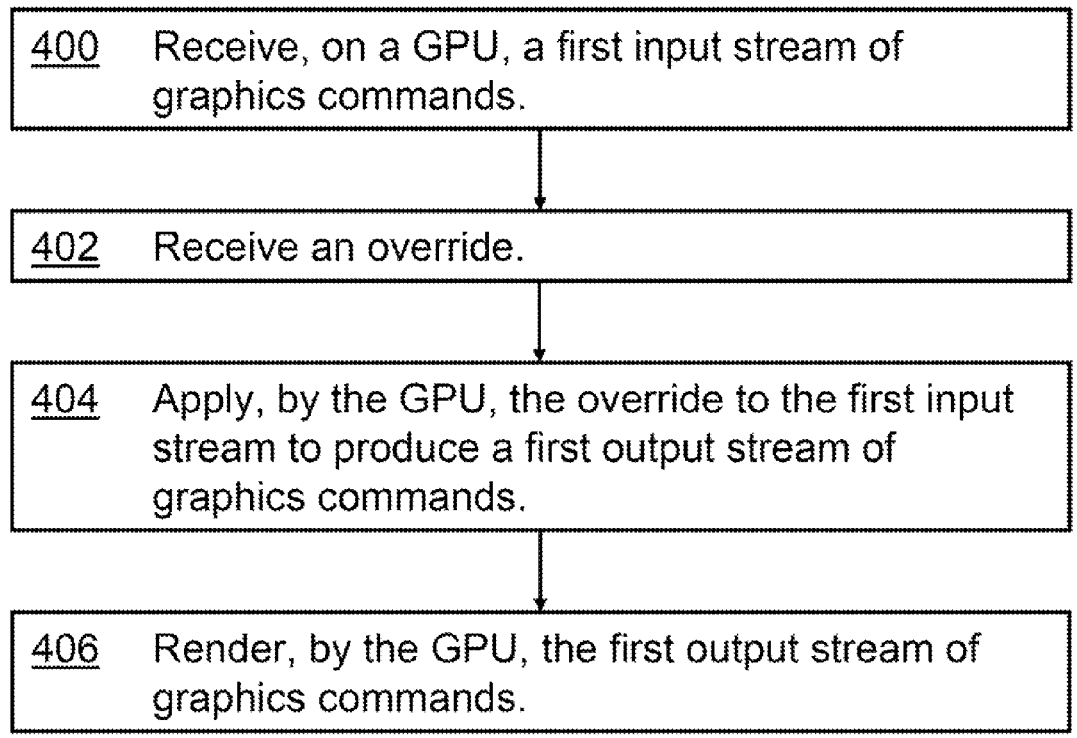
FIG. 4 is a flowchart of an alternative method for applying a graphics override.

FIG. 4 presents a method for implementing a GPU-hosted override, such as the override 204 of FIG. 2. The considerations and details discussed above in relation to the CPU-hosted override 202 apply as well to this case and need not be repeated. In step 400, the GPU 120 receives an input stream of graphics commands 200d (see FIG. 2). In step 402, the GPU 120 receives the override 204 from the CPU 102. (There is no significance to the ordering of steps 400 and 402: The override 204 may have been received in step 402 long before the stream of graphics commands 200d arrives and may even reside permanently on the GPU 120.) The override 204 amends the incoming stream of graphics commands 200d in step 404 to produce an amended output stream (not shown in FIG. 2). The GPU 120 renders that output stream as appropriate.

It is anticipated that, in particular situations, hosting an override on the GPU 120 will have certain advantages over hosting a similar override on the CPU 102. Different GPUs support different features and have different strengths and weaknesses, so an override tailored to a particular GPU architecture may be more efficient than a CPU-hosted override. In a computing architecture where multiple CPUs provide input to a single GPU, the GPU may be the best place to coordinate a unified display paradigm.

Figure 5A:
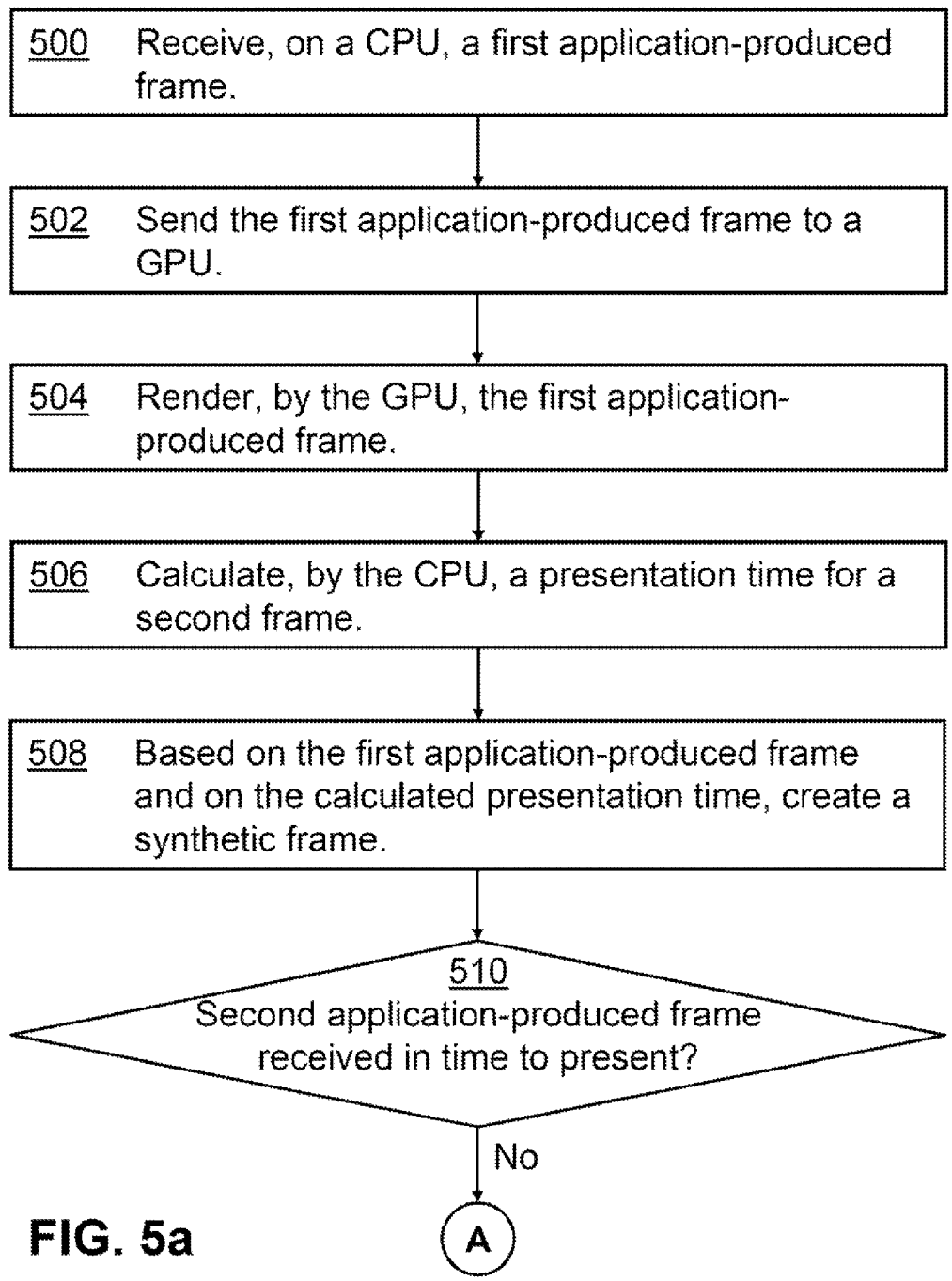
FIGS. 5a and 5b together form a flowchart of a representative method for creating synthetic frames.
Figure 5B:
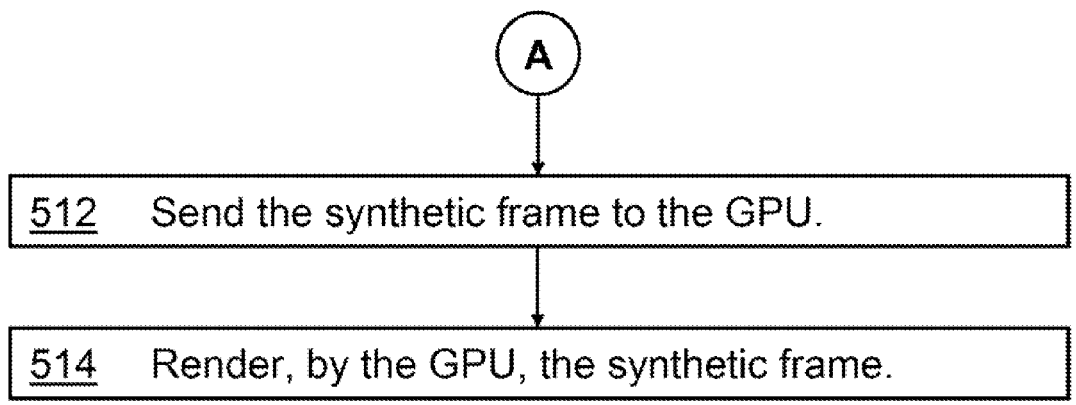
Figure 6:
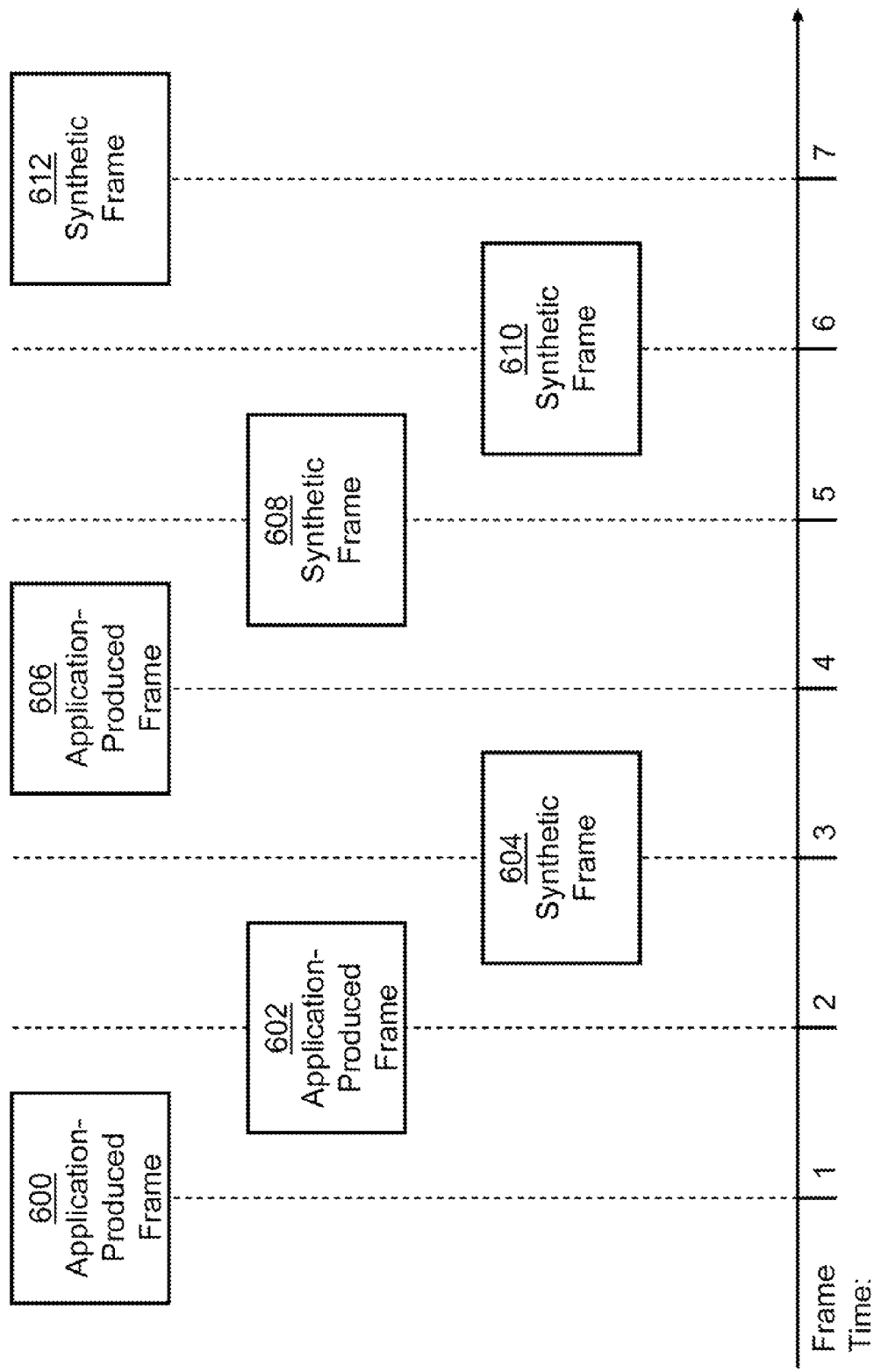
FIG. 6 is a rendering timeline for a series of application-produced and synthetic frames.

FIGS. 5 and 6 present the case of a particular override that accounts for factors outside of the control of the source application 112 itself. Consider an application 112 that produces frames at a fixed rate. In some examples, the application 112 need only retrieve already existing frames from, say, the memory system 106 and present them to the GPU 120. In other examples, such as an interactive computer game or an enhanced reality display, the application 112 creates each frame, potentially using significant computational resources in order to do so. Because of resource competition and other conflicts, it is well know that in some situations an application 112 may fail to present its frames at the specified rate. Then, when resources become available, the application 112 may produce all of the frames that it missed earlier and send this series of frames to the GPU 120. These frames may then be rendered at an inappropriate rate. When viewed by a user, the resulting motion can be jerky or may suffer from other annoyances. An override can be developed to address these issues.

In step 500 of FIG. 5a, a frame produced by the application 112 is received by the CPU 102. This application-produced frame is sent to the GPU 120 in step 502 and is rendered in step 504. Turning to FIG. 6, this application-produced frame 600 is rendered at the first frame time.

As steps 500 through 504 are performed (perhaps repeatedly for frame after frame), an override 202 watches over this process. In step 506, the override 202 calculates (or otherwise determines) the time when a next frame needs to be presented. (In a very simple example, this would be the frame time of the next frame, based solely on the frame time of the first frame and the known frame rate. In other embodiments, the override 202 may be working further ahead in the anticipated sequence of frames.)

Step 508 is, in some situations, technically optional. In this step, the override 202 produces its own frame to be displayed at the next frame time. There are several possible procedures for producing such a "synthetic" frame. In a sophisticated example, the override 202 could examine the past few application-produced frames, note any consistent movement or other change in that short sequence, and then produce the synthetic frame by predicting a continuation of that movement into the next frame time. While the motion prediction may turn out to be incorrect, the viewed result would, in some situations, not be as jarring as simply repeating the last application-produced frame. With even more sophistication, the override 202 could gather further information from the hosting device 100 such as, for example, user-input data, and produce a scene graph based on the gathered information as well as on the previously received application-produced frames. From the scene graph, the override 202 could predict the visual effects that the application 112 is trying to produce. The override 202 could then produce the synthetic frame accordingly.

The override 202 can use information beyond the previously received application-generated frames when creating the synthetic frame. As one example, the override 202 can monitor user inputs to the computing device 100. If a user moves the computing device 100 away from himself (as detected by, say, an accelerometer), then the override 202 can create a synthetic frame that is a zoomed-out perspective of the previous application-produced frame. In another example, if the user touches a position on a touch-sensitive display screen, then the override 202 can shift the viewer's point-of-view based on that touch (or on a more elaborate gesture). (This can be enabled, for example, when the input stream of graphics commands 200b includes enough information to draw a scene larger than that currently displayed or includes enough information for the override 202 to create a scene graph of a fully three-dimensional scene.) In sum, the override 202 can apply user-input information independently of mediation by the source application 112.

In step 510, the override 202, as it watches over the stream of application-produced frames, decides whether or not the application 112 is going to produce the next frame in time (an analysis based, in part, on the known frame rate). If it does, then everything is well, and the synthetic frame produced in step 508 is discarded. (Another procedure would be to only create the synthetic frame in step 508 if step 510 determines that the synthetic frame is needed. That is why step 508 is technically optional.)

If, on the other hand, the next application-produced frame is not available in time, then in step 512 of FIG. 5b, the synthetic frame produced in step 508 is sent to the GPU 120 where it is rendered at the appropriate frame time in step 514.

This method is illustrated in FIG. 6 where the application 112, after producing two frames 600 and 602 for the first and second frame times, fails to produce the next frame in time. The override 202 notes this and produces a synthetic frame 604 for the third frame time. By the fourth frame time, the application 112 catches up and produces frame 606. (If the application 112 also belatedly produces a frame for the third frame time, then in some embodiments, that frame is discarded.) After that, the application 112 fails to produce the next three frames in time, so the override 202 produces synthetic frames 608, 610, 612.

The process of FIGS. 5a and 5b continues, looping as long as the application 112 is attempting to produce frames. Note, however, that in some situations, the process may not be looping on a strictly frame-by-frame basis. Some applications 112 are able to produce a number of frames at one time and to send the series of frames to the GPU 120 to be rendered at the correct times. The teachings of FIGS. 5a and 5b apply to this scenario as well.

Finally, FIGS. 7 through 9 portray a scenario where an application 112 is developed that depends upon the presence of an override. This scenario is called "A/B" testing. This is a way to guide product development by soliciting the input of users. In particular, two (or more) sets of users are given copies of an application 112. However, not all copies are identical. Normally, one set of users receives a copy that embodies one choice for a design or functional element (e.g., the "A" version), while the other set of users gets a copy that embodies a different choice (the "B" version). Users provide feedback, and from that feedback it is determined which choice is more popular. An advantage of using an override is that the application 112 need not be changed during testing: Only the overrides are different.

For more specific details of how overrides can assist in A/B testing, turn to FIG. 7 which shows a method for a server to gather user-response data in an A/B testing scenario. The application 112 is sent to a first set of end-user devices 100 in step 700 along with instructions for gathering user-response data. (In some embodiments, a separate utility may be developed for gathering user-response data, and this utility need not be sent along with the application 112 being tested.) (In some embodiments, the application 112 is not sent but is otherwise made available to the end-user devices 100.) In the method of FIG. 7, the design or function choice being tested is embodied in a first override (version "A"), sent along with the application 112. For example, the override can turn the backgrounds behind all text messages produced by the application 112 into a particular shade of blue.

FIG. 8 shows what can happen on the end-user device 100. In step 800, the end-user device 100 receives the application 112 along with the override (and, potentially, the instructions for gathering user-response data). The override is applied to the stream of graphics commands produced by the application 112 in step 802. User-response data (which may be explicitly queried for or may be implicitly derived from behavioral observations of the user) are gathered in step 804 and returned in step 806.

Returning to FIG. 7, the user-response data generated by the end-user device 100 using the method of FIG. 8 are received by the server in step 702.

Steps 700 and 702 are repeated as steps 704 and 706 but with a different override (the "B" version that, for example, turns the backgrounds behind all text messages produced by the application 112 into a shade of red) and, possibly, with a different set of end-user devices. This is illustrated at the first time increment of FIG. 9: The application 112 is sent out with override A in 900 and with override B in 902.

The user responses to the "A" and "B" versions are compared to see which version is "better" in some sense (more popular, easier to use, maybe more efficient of computing resources). This is shown by 904 of FIG. 9 where override B is preferred.

In optional step 708, the testing continues to refine the outcome by sending new overrides that embody new choices. In the case of FIG. 9, the previous winner override B is sent out again (906) to be tested against a new override C (908).

When testing is complete, and a final choice is selected for implementation, that implementation may be coded into the application 112 itself or, per optional step 710, the final implementation may be left as an override shipped with the application 112. In FIG. 9, override C is the final winner (910).

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. On a computing device with a central processing unit (CPU) and a graphics processing unit (GPU) distinct from, but operatively connected to, the CPU, a method for presenting graphical information, the method comprising:
sending, by the CPU to the GPU, an override module;
sending, by the CPU to the GPU, a stream of graphics commands;
intercepting, by the override module on the GPU, the stream of graphics commands;
amending, by the override module on the GPU, the stream of graphics commands, the amending comprising at least one graphics modification; and
providing, by the override module on the GPU, the amended stream of graphics commands for rendering by the GPU.

2. The method of claim 1 wherein the stream of graphics commands consists of a single graphics command.

3. The method of claim 1 wherein the amending comprises a single graphics modification.

4. The method of claim 1 wherein the at least one graphics modification is an addition of a new graphics command, a deletion of a graphics command, an amendment to a graphics command, or a re-ordering of graphics commands.

5. The method of claim 1 wherein amending the stream of graphics commands comprises creating a new output frame.

6. The method of claim 5 wherein creating a new output frame is based, at least in part, on a current time or a desired output frame rate.

7. The method of claim 1 wherein amending the stream of graphics commands comprises adding motion to the stream of graphics commands.

8. The method of claim 1 wherein amending the stream of graphics commands comprises:
generating an input scene graph based, at least in part, on the stream of graphics commands; and amending, by the override module, the input scene graph to create an output scene graph, wherein providing the amended stream of graphics commands is based, at least in part, on the output scene graph.

9. The method of claim 8 wherein amending, by the override module, the input scene graph comprises applying an element identifier, a shader, a properties module, or a physics engine.

10. The method of claim 1 wherein the amended stream of graphics commands consists of a single graphics command.

11. The method of claim 1 further comprising:
sending, by the CPU to the GPU, an additional stream of graphics commands distinct from the stream of graphics commands;
intercepting, by the override module on the GPU, the additional stream of graphics commands;
amending, by the override module on the GPU, the additional stream of graphics commands; and
providing, by the override module on the GPU, the additional amended stream of graphics commands for rendering by the GPU.

12. The method of claim 11 wherein the amendment to the stream of graphics commands is based, at least in part, on the additional stream of graphics commands.

13. A system comprising:
a computing device configured for presenting graphical information;
a central processing unit (CPU);
a graphics processing unit (GPU) distinct from, but operatively connected to, the CPU; and
one or more computer-readable storage media devices comprising instructions that are executable by the CPU to cause the computing device to perform a process comprising:
sending, by the CPU to the GPU, an override module;
sending, by the CPU to the GPU, a stream of graphics commands;
intercepting, by the override module on the GPU, the stream of graphics commands;
amending, by the override module on the GPU, the stream of graphics commands, the amending comprising at least one graphics modification; and
providing, by the override module on the GPU, the amended stream of graphics commands for rendering by the GPU.

14. The system of claim 13 wherein the computing device is a set-top box, a personal communications device, a mobile telephone, a personal digital assistant, a personal computer, a tablet computer, a gaming console, a server, or a plurality of servers.

15. The system of claim 13:
wherein the computing device comprises a display; and
wherein rendering the amended stream of graphics commands comprises rendering graphical information to the display.

16. The system of claim 13:
wherein the computing device comprises a communications interface; and
wherein rendering the amended stream of graphics commands comprises transmitting, via the communications interface, a rendering of the amended stream of graphics commands.

17. The system of claim 13:
wherein the computing device comprises a memory; and
wherein presenting the amended stream of graphics commands comprises writing a rendering of the amended stream of graphics commands to the memory.

18. The system of claim 13 wherein the CPU comprises a plurality of processors.

19. A computing device configured for presenting graphical information, the computing device comprising:
a central processing unit (CPU) configured to send an override module and to execute instructions to provide a stream of graphics commands; and
a graphics processing unit (GPU) distinct from, but operatively connected to, the CPU and configured to receive the override module and render the stream of graphics commands provided by the CPU, the override module hosted on the GPU and configured to:
intercept the stream of graphics commands provided by the CPU prior to the stream of graphics commands being rendered by the GPU;
amend the stream of graphics commands, the amendment comprising at least one graphics modification; and
provide the amended stream of graphics commands to the GPU to be rendered.

20. The computing device of claim 19 wherein the instructions to provide a stream of graphics commands are received from a process running on the central processing unit.

* * * * *